United States Patent [19]

Lorimor

[11] 4,133,510
[45] Jan. 9, 1979

[54] VALVE SPOOL POSITIONER
[75] Inventor: Larry W. Lorimor, Joliet, Ill.
[73] Assignee: Caterpillar Tractor Co., Peoria, Ill.
[21] Appl. No.: 767,087
[22] Filed: Feb. 9, 1977
[51] Int. Cl.$^2$ ............................................. F15B 13/042
[52] U.S. Cl. ................................. 251/31; 92/165 PR; 137/269; 137/596.13; 137/625.63; 137/625.66
[58] Field of Search ................ 137/269, 596.13, 625.3, 137/625.63, 625.66; 251/31; 92/165 PR

[56] References Cited
U.S. PATENT DOCUMENTS

| | | | |
|---|---|---|---|
| 2,956,549 | 10/1960 | Malpass | 92/165 PR |
| 3,451,423 | 6/1969 | Priese | 251/31 X |
| 3,731,700 | 5/1973 | Cohen | 137/833 |
| 3,771,564 | 11/1973 | Bianchetta et al. | 137/596.13 X |
| 3,847,180 | 11/1974 | Kroth et al. | 137/596.13 |

Primary Examiner—Gerald A. Michalsky
Attorney, Agent, or Firm—Phillips, Moore, Weissenberger, Lempio & Majestic

[57] ABSTRACT

A pilot operated valve comprised of a cylindrical grooved spool having axially aligned throttling slots which require alignment with certain ports in an encompassing housing is prevented from rotation in the housing during reciprocation therein by a noncircular tang extending outwardly of the housing and fitted in a specially configured pilot chamber formed in an attached cover.

6 Claims, 2 Drawing Figures

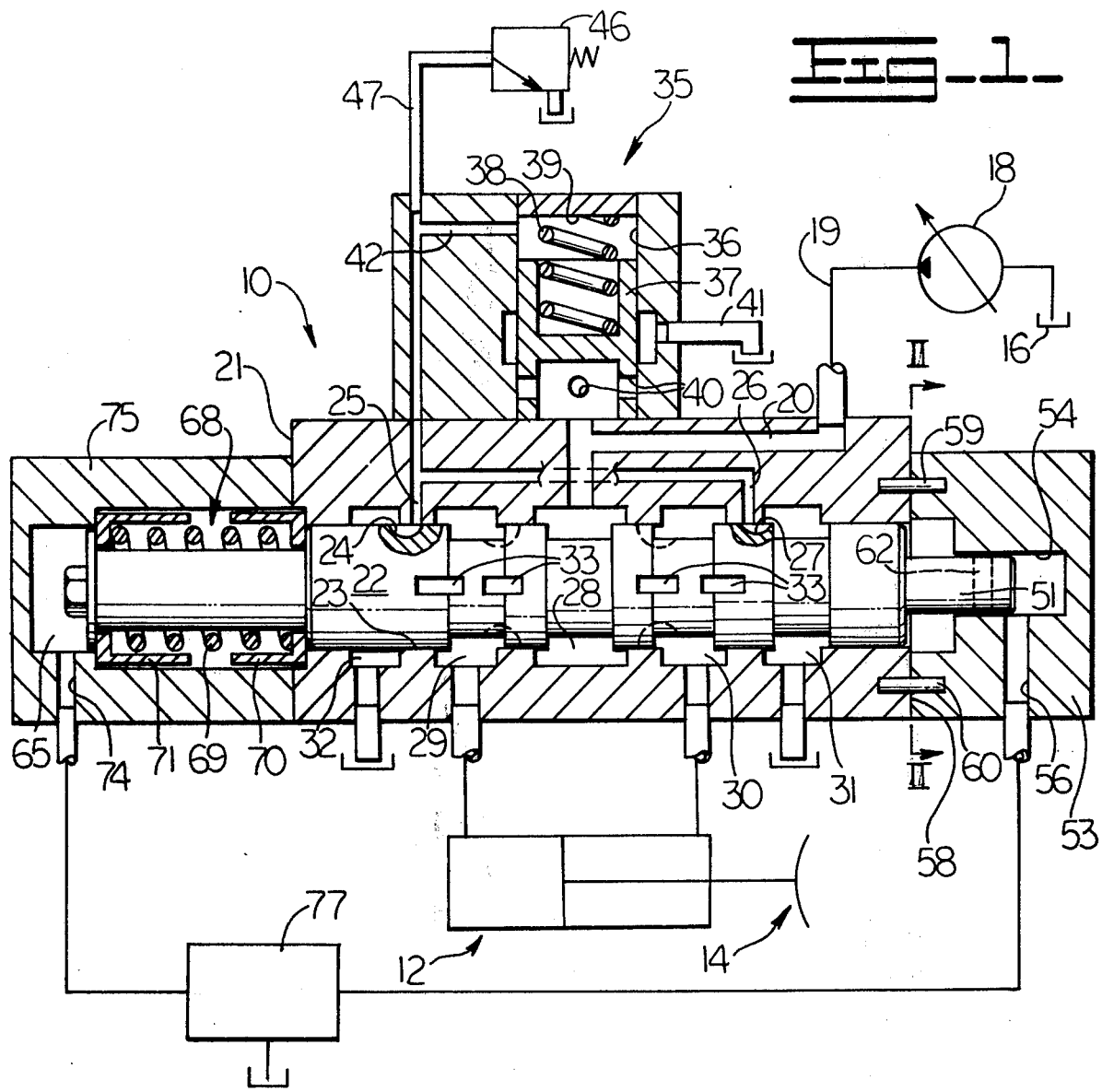
Fig_1_
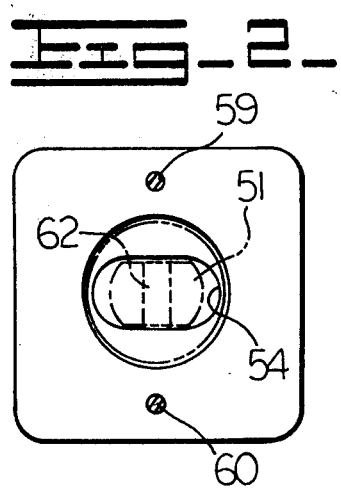
Fig_2_

VALVE SPOOL POSITIONER

BACKGROUND OF THE INVENTION

This invention relates to a spool valve having throttling slots which are required to be in alignment with certain ports in the encompassing housing. This results in a requirement to prevent rotation of the valve spool within the housing. The invention relates in particular to a valve spool which fulfills the above criteria and which is pilot operated.

Spool valves which are manufactured with throttling slots in the spool thereof to communicate a groove in the housing with the next adjacent groove under controlled conditions are well known in the art. Generally the grooves in the housing are annular and spool alignment is not critical. Certain spool valves are constructed with throttling grooves which require alignment with ports communicating with a land in the bore of the valve rather than with a groove defined in the bore. Valve spools of the configuration just described are known to be manually controlled by means of a linkage which prevents rotation of the valve spool in the housing thus maintaining the critical alignment. In certain applications it has been found desirable to operate this same valve not by a control lever but by pilot pressure from a remote location.

Normally pilot operated valves are constructed with a cylindrical shaped pilot chamber wherein the pilot fluid is applied against one end or the other end of the valve spool to urge the spool in desired direction. Generally if the spool rotates during reciprocation in the associated housing, no undesirable results occur. However, in the present situation rotation must be prevented. To extend a noncircular portion of the valving spool into a pilot chamber and further to seal the pilot chamber against leakage proves difficult in view of the noncircular nature of the opening due to the inherent problem of machining noncircular openings. This machining problem coupled with the necessity for close tolerances and providing for seal means in the pilot chamber to prevent leakage, makes the problem more difficult. To add an actuator motor to the control lever of manually controlled valves, although providing a satisfactory solution, unduly complicates the problem and adds weight to the associated machinery.

SUMMARY OF THE INVENTION

The present invention is directed to overcoming one or more of the problems as set forth above.

Broadly stated, the invention is a pilot operated spool valve comprising an elongated housing defining an axial bore and a first radial port communicating with the axial bore. A valve spool reciprocally mounted therein defines axial slots alignable with the first radial port with the valve spool resiliently biased to a first position. A first end member is affixed to the housing to close one end of the axial bore. The first end member defines therein an axially aligned first pilot chamber. The spool is formed with an axially extending noncircular tang formed to fit in a tang cavity defined in the first end member and having generally the same cross-sectional shape as the noncircular tang. The first end member is sealingly associated with the housing while the spool is sealingly associated with the axial bore of the housing proximate the first end to form a substantially fluid tight pilot chamber.

The aforesaid objects and others will become apparent from a study of the accompanying drawings and the following specification.

BRIEF DESCRIPTION OF THE DRAWINGS

FIG. 1 is a valve and valve spool, shown partly in section, of the type wherein rotation of the valve spool is critical, and incorporating the structure of this invention.

FIG. 2 is a view of the end member taken at line II—II of FIG. 1 and showing the shape of the pilot chamber which prevents rotation of the valve spool.

DETAILED DESCRIPTION OF THE PREFERRED EMBODIMENT

A spool valve 10 of the type requiring means to prevent rotation is illustrated in FIG. 1. Spool valve 10 is shown in relation to a hydraulic motor means, in particular, a double acting cylinder 12 for operating a work implement 14. A reservoir 16 contains unpressurized fluid which is withdrawn therefrom and pressurized by means of a pump such as variable pressure pump 18. The pressurized fluid is communicated by means of a conduit 19 to a branching passage 20, defined in housing 21 of spool valve 10.

Rotation of spool 22 in bore 23 must be prevented in view of alignment of slots 24 and 27, with passages 25 and 26 respectively in the housing 21. The purpose of these slots will become apparent, however other features of this valve structure should be understood first. Housing 21 is formed with a centrally located inlet chamber 28 in communication with branching passage 20. Adjacent to inlet chamber 20 are first and second service chambers 29 and 30 in communication respectively with the head end and the rod end of double acting cylinder 12. Movement of spool 22 to the right as indicated in FIG. 1 communicates inlet chamber 28 with service chamber 29 and thus the head end of double acting cylinder 12. Simultaneously service chamber 30 which is in communication with the rod end of double acting cylinder 12 is placed in communication with a drain chamber 31 formed in the housing 21. A similar drain chamber 32 is formed at the other opposite end of housing 21 to drain the head end of the double acting cylinder 12 when the spool is moved in the other opposite direction. The spool 22 is formed with appropriate lands to separate the aforedescribed chambers. These lands define a plurality of metering grooves 33 for modulation of the pressure between inlet chamber 28 and the working chambers of the double acting cylinder 12.

Forming a part of the flow compensation valve design is the dump valve 35. Dump valve 35 is comprised of a bore 36 in which a reciprocally mounted sleeve 37 is resiliently urged toward one end by a resilient member 38 disposed in bore 36 distal of spool valve 10 between sleeve 37 and a first end 39 of bore 36. Branching passage 20 communicates with the other end of bore 36 so that with pressure applied in branching passage 20 sleeve 37 is urged toward first end 39 against the bias of resilient member 38. Sleeve 37 is formed with a plurality of radial bores 40 which communicate with a conduit 41 when sleeve 37 is urged toward first end 39. A passage 42 communicates first end 39 of dump valve 35 with passages 25 and 26 in spool valve 10. A resiliently biased relief valve 46 is provided in a conduit 47 communicating with passage 42.

Slots 24 and 27 are particularly oriented to communicate with passages 25 and 26. Reference to FIG. 1 will indicate throttling grooves 33 would overlap slots 24 and 27 and act contrary to the purpose of these slots if spool 22 were allowed to rotate in bore 23. Slots 24 and 27 communicate passages 25 and 26 to drain chamber 32 or 31 respectively with the spool in the neutral position as shown. With the spool moved to the right in FIG. 1, pressure communicated to service chamber 29 via throttling grooves 33 is further communicated through slot 24 to passage 25 so that this pressure acting in cooperation with resilient member 38 urges sleeve 37 downwardly blocking communication between passage 20 and drain conduit 41 to maintain pressure communicated to the head end of the double acting cylinder 12. At the same time the slot 27 with the valve spool moved rightwardly is moved out of communication with passage 26.

In order to maintain the orientation of spool 22, the spool is formed with an axially extending noncircular tang 51. Housing 21 is adapted to receive end cover 53 formed with a tang cavity 54 to receive a noncircular tang 51. End cover 53 serves not only to prevent rotation of spool 22 by the tang 51 fitting into tang cavity 54 but also serves as a housing for a pilot chamber used to urge valve spool 22 leftwardly as viewed in FIG. 1. This is accomplished through a passage 56 communicating with cavity 54 through which fluid may be applied to cavity 54. End cover 53 sealingly engages housing 21 along a surface 58 of housing 21. Appropriate sealing means may be disposed therebetween. End cover 53 and housing 21 are kept in alignment by at least two mating pins 59 and 60 which are formed to be received in aligned bores in housing 21 and end cover 53 so that with tang 51 disposed in cavity 54 proper alignment is maintained between slots 24 and 27 and ports 25 and 26.

A second pilot chamber 65 is provided at the other opposite end of housing 21, and includes a second end cover 75 and double acting resilient means 68 to bias valve spool 22 to a mid or neutral position. Resilient means 68 is formed with a helical spring member 69 engaged in a spring retainer cup 70 adjacent valve spool 22 and a similarly formed spring retainer cup 71 adjacent pilot chamber 65. Spring retainer cup 70 and spring retainer cup 71 extend axially toward one another leaving a sufficient gap therebetween so that valve spool 22 may be urged either rightwardly or leftwardly as indicated in FIG. 1. This gap is sufficient to allow proper communication of slots 24 and 27 with the appropriate grooves in the housing for operation of the valve spool.

A passage means 74 is provided in the second end cover 75 in which pilot chamber 65 is formed, passage means 74 provides fluid to pilot chamber 65 from a pilot fluid source.

In operation, fluid under pressure is communicated from a pilot fluid source 77 to either passage 56 or passage 74 to urge spool 22 leftwardly or rightwardly as the case may be. Rotation of tang 51 on movement in either direction of the spool is constrained by the shape of the pilot chamber. By constraining rotation of tang 51, slots 24 and 27 remain in alignment with passages 25 and 26 respectively.

A secondary advantage is that the tang 51 may include a transverse hole 62 for a mechanical linkage. With the substitution of a spring 69 with a spring having a lower spring rate, the valve may then be mechanically shifted for test purposes; or with a special end housing (which retains the non-rotation features) the valve may be altered for mechanical actuation from an operator's station.

THE EMBODIMENTS OF THE INVENTION IN WHICH AN EXCLUSIVE PROPERTY OR PRIVILEGE IS CLAIMED ARE DEFINED AS FOLLOWS:

1. A pilot operated spool valve comprising:
   an elongated housing defining an axial bore and a first radial port communicating with said axial bore;
   a valve spool reciprocally mounted in said axial bore and resiliently biased to a first position;
   a first end member affixed to said housing to close one end of the axial bore and defining a first pilot chamber;
   a second end member affixed to said housing to close the other end of said axial bore and defining a second pilot chamber;
   said spool defining an axial slot therein and having an axially extending noncircular tang;
   the first pilot chamber in the first end member forming a tang cavity having substantially the same cross-sectional shape as the noncircular tang;
   said spool reciprocally movable in said axial bore with said tang movable in said tang cavity, whereby rotation of said spool is prevented.

2. The pilot operated spool valve of claim 1 further comprising alignment means for maintaining the first end member in a predetermined orientation relative to the housing.

3. The pilot operated spool valve of claim 2 further comprising a source of fluid pressure and valve means for selectively communicating fluid pressure to the first pilot chamber or the second pilot chamber to cause reciprocal movement of the valve spool.

4. The pilot operated spool valve of claim 3 and further comprising resilient means for resiliently biasing the valve spool to a first position.

5. The pilot operated spool valve of claim 4 wherein the resilient means biasing the valve spool to a first position comprises a helical spring disposed in the second pilot chamber.

6. The pilot operated spool valve of claim 2 wherein the elongated housing defines in the one end two bores and further wherein the first end member defines two bores in alignment with the two bores of the one end and in the surface of the first end member contiguous with the housing, and further wherein the alignment means comprises two pin members each formed to fit and disposed in said bores in the housing and simultaneously to fit in the bores of the first end member whereby said tang cavity is aligned with the axial bore.

* * * * *